(12) United States Patent
Lee

(10) Patent No.: US 6,978,596 B1
(45) Date of Patent: Dec. 27, 2005

(54) TRANSITIONAL MODULAR ITALIAN CHARM LINK

(76) Inventor: Alfred Lee, 1811 Douglas Blvd., #A1, Roseville, CA (US) 95611

( * ) Notice: Subject to any disclaimer, the term of this patent is extended or adjusted under 35 U.S.C. 154(b) by 0 days.

(21) Appl. No.: 10/706,170

(22) Filed: Nov. 12, 2003

(51) Int. Cl.[7] ............................. F16G 13/00; A44C 5/08
(52) U.S. Cl. ...................... 59/79.3; 59/79.1; 59/79.2; 59/80; 59/85
(58) Field of Search ........................ 59/78, 80, 79.1, 59/79.2, 79.3, 84, 85

(56) References Cited

U.S. PATENT DOCUMENTS

| | | | | |
|---|---|---|---|---|
| 1,142,160 A | * | 6/1915 | Goldstein | 59/79.3 |
| 1,564,563 A | * | 12/1925 | Hadley | 59/79.3 |
| 1,589,728 A | * | 6/1926 | Wachenheimer | 59/79.3 |
| 1,659,438 A | * | 2/1928 | Nelson | 59/79.3 |
| 1,659,990 A | * | 2/1928 | Boots | 59/79.3 |
| 1,739,722 A | * | 12/1929 | Kestenman | 59/79.3 |
| 2,889,681 A | * | 6/1959 | Augenstein | 59/79.3 |

* cited by examiner

Primary Examiner—David Jones
(74) Attorney, Agent, or Firm—Michael I. Kroll; Mark C. Jacobs

(57) ABSTRACT

A 13 mm transitional modular Italian charm link capable of connecting to smaller 9mm charm links and/or other 13 mm charm links in various combinations. Charm links connect to one another using a spring loaded hook and post combination with the hook element emanating from the charm face to maintain the continuity of the bracelet but the hook elements of existing charm links do not properly mate with charm links of a different size. The present invention provides a charm link that may be configured in any of three configurations having a transitional hook and/or transitional post to accommodate charm links of a smaller width.

10 Claims, 6 Drawing Sheets

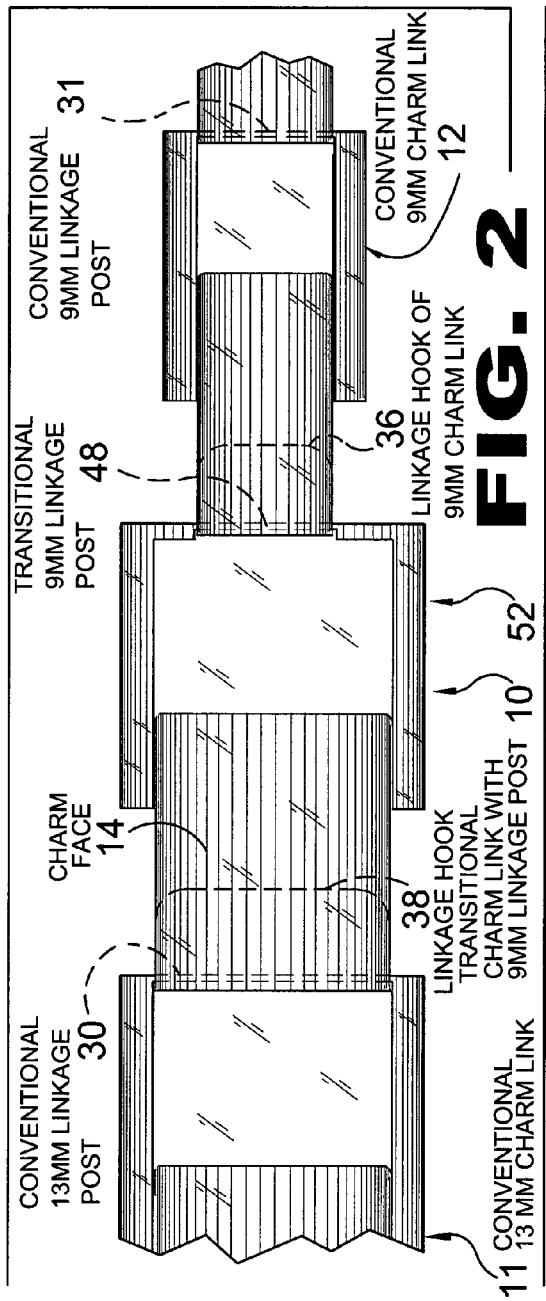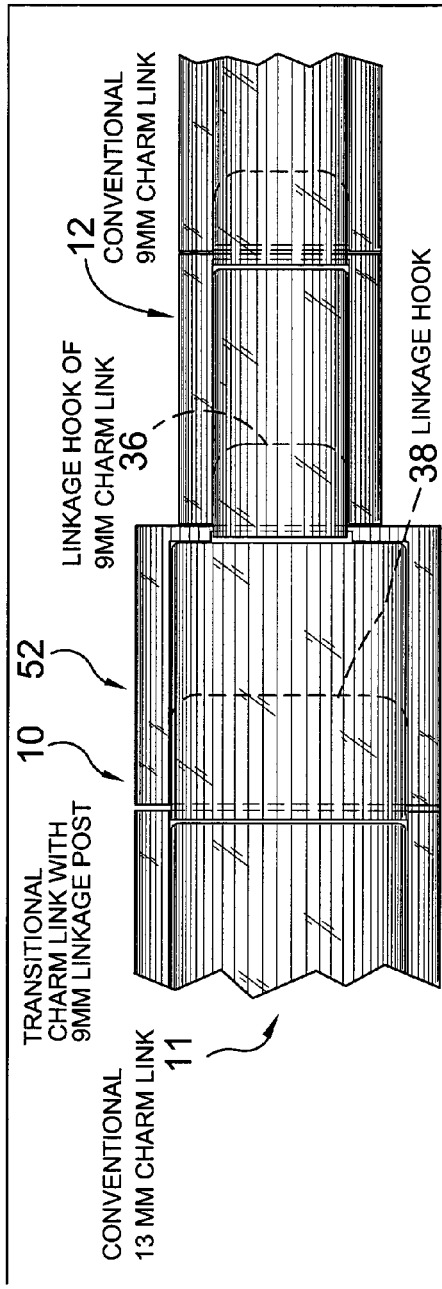

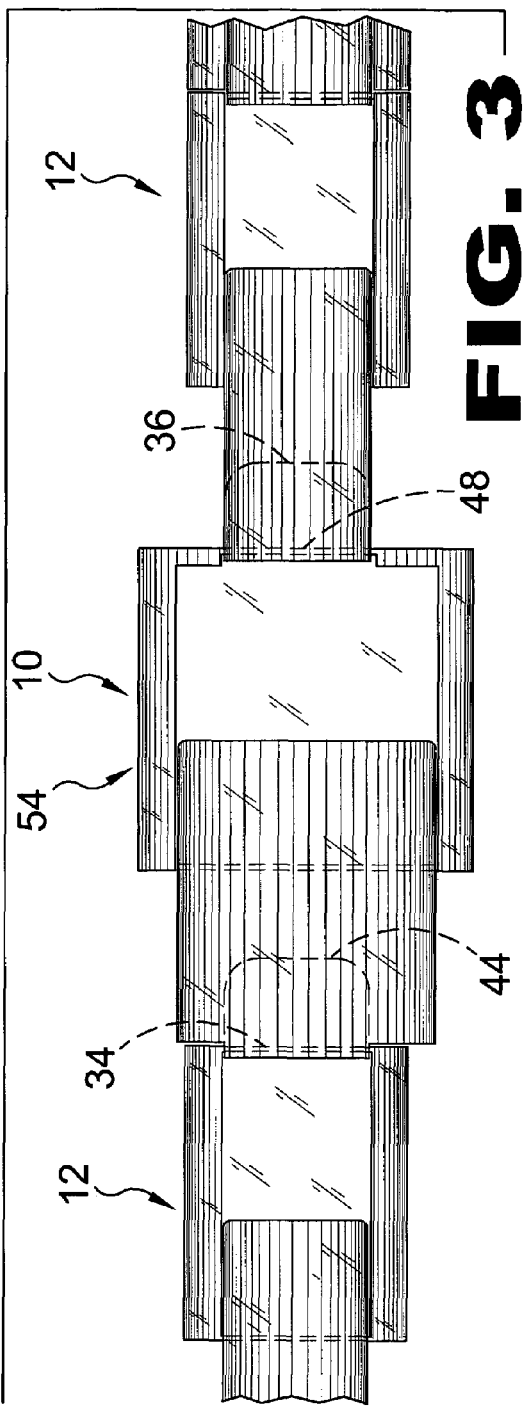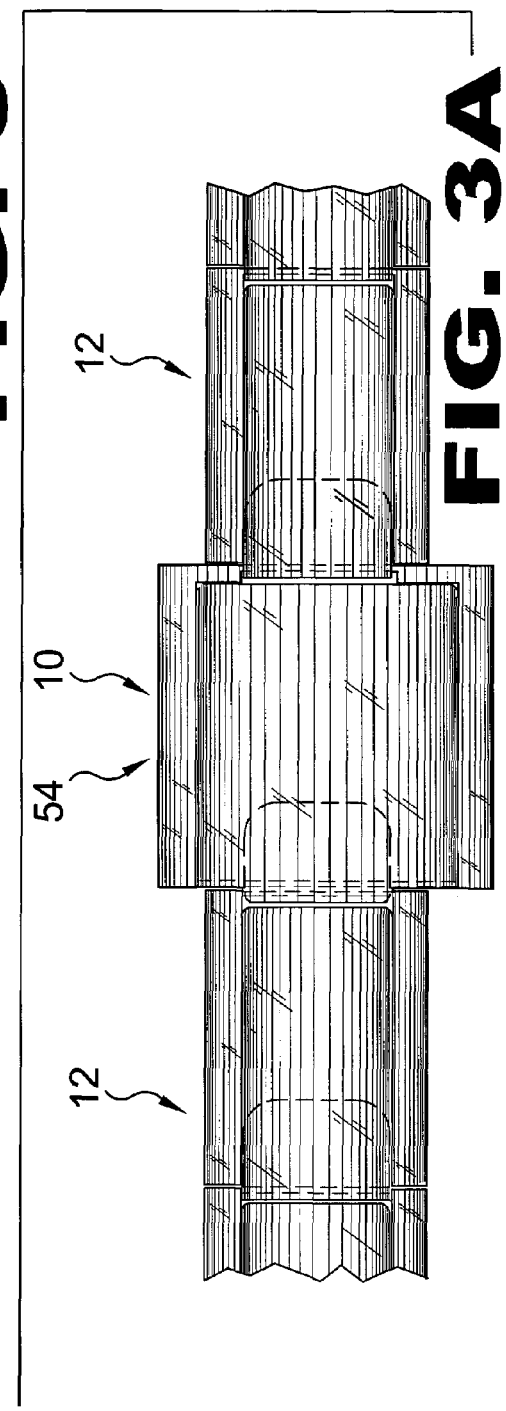

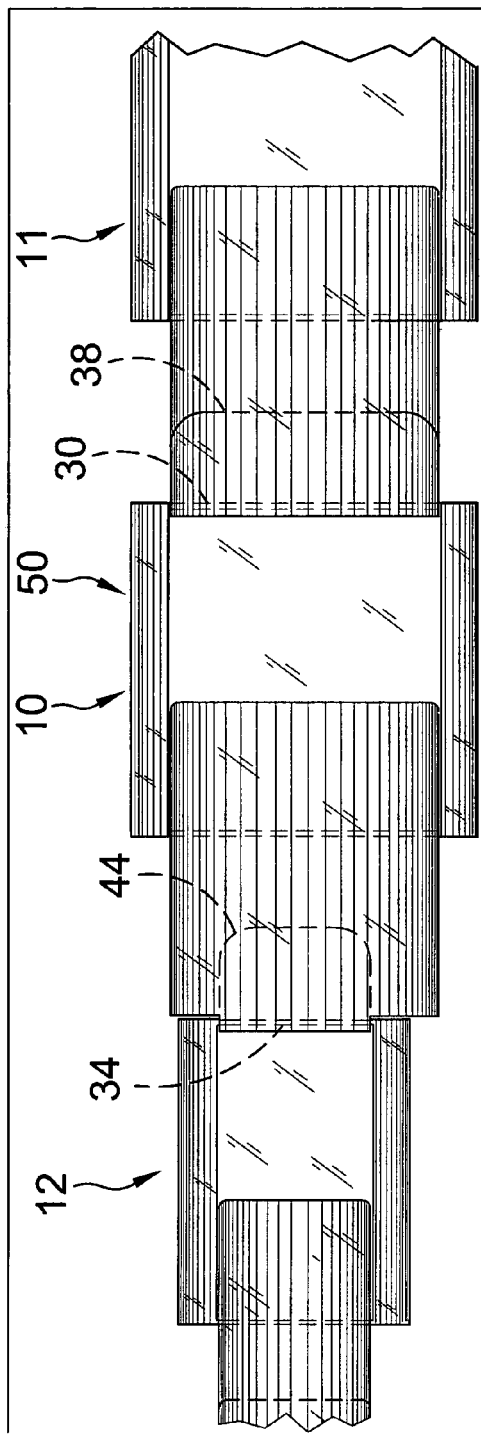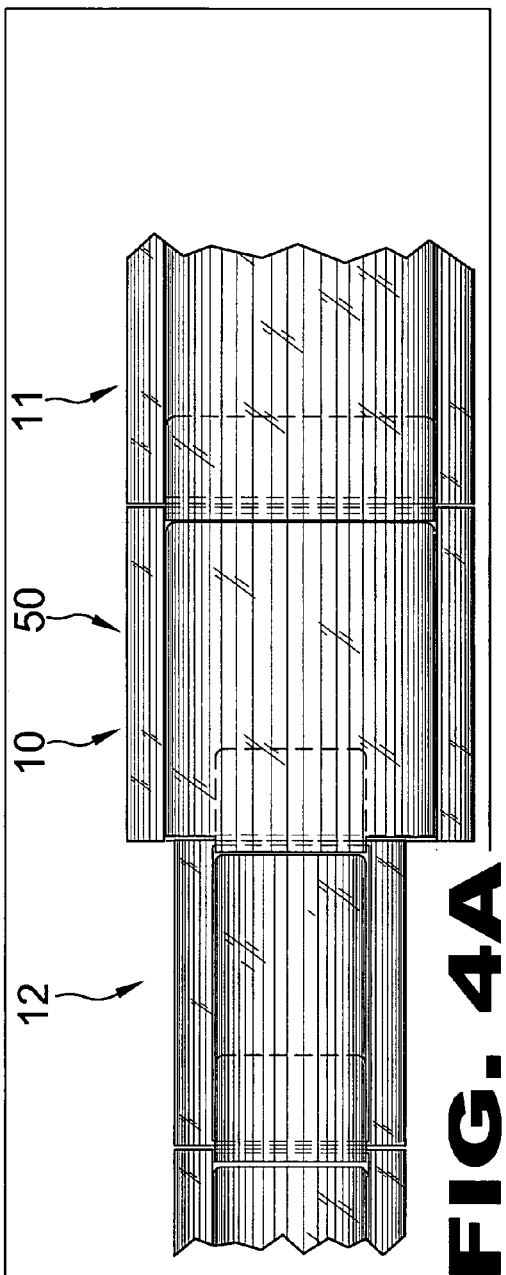

TRANSITIONAL MODULAR ITALIAN CHARM LINK

BACKGROUND OF THE INVENTION

Field of the Invention

The present invention relates generally to charm links for bracelets and the like and, more specifically, to a charm link that has a linkage means to enable a charm link to fasten to at least one other charm link that is significantly smaller than itself.

Conventional charm links known in the art typically fasten to one another via a hook and post linkage assembly. The charm links usually comprise a base housing with a slidable, spring-loaded charm face having substantially U-shaped ends, one of which is a linkage hook having an end that is inserted through a linkage recess defined by a linkage post on the adjacent charm link. The standard sizes of charm links common in industry are 13 mm and 9 mm but the linkage hook of the 13 mm charm link is too large to be inserted through the linkage recess of a 9 mm charm link. Conversely, the linkage hook of the 9 mm charm link may be inserted through the linkage recess of the adjacent charm link but has too much play to remain in the desired centered position and tends to slide along the linkage post.

The present invention seeks to overcome the shortcomings of the prior art by providing a 13 mm transitional modular Italian charm link wherein the linkage hook and/or linkage recess are designed to accommodate the mating component of at least one standard 9 mm charm link.

The transitional modular Italian charm link of the present invention is provided with three different configurations to offer the user a plurality of options for using more than one size charm link when putting the bracelet together. A first configuration has a linkage hook sized for a 13 mm charm link and the linkage post and recess of the transitional modular Italian charm link sized to conform to the linkage hook of a 9 mm charm link. A second configuration has the transitional modular Italian charm link having the linkage post, recess and hook all conforming for attachment to the respective mating components of a 9 mm charm link. This configuration is particularly advantageous because not only can a 9 mm charm link be secured to either side thereof but both sides will also accept attachment to other like 13 mm transitional modular Italian charm links. A third configuration provides a transitional modular Italian charm link having a linkage hook for 9 mm attachment and a linkage post and recess for a 13 mm charm link.

Description of the Prior Art

There are other linking devices designed for jewelry.

SUMMARY OF THE PRESENT INVENTION

A primary object of the present invention is to provide a transitional modular Italian charm link that will allow the user to selectively fasten different sized charm links to one another as desired.

Another object of the present invention is to provide a 13 mm transitional modular Italian charm link that can fasten to a 9 mm charm link and have a 13 mm charm link fastened thereto.

Yet another object of the present invention is to provide a transitional 13 mm charm link that can fasten to a 13 mm charm link and can have a 9 mm charm link fastened thereto.

Still another object of the present invention is to provide a 13 mm transitional modular Italian charm link that can fasten to a 9 mm charm link and have a 9 mm charm link fastened thereto.

Still yet another object of the present invention is to provide a transitional modular Italian charm link that is simple and easy to use.

Another object of the present invention is to provide a transitional modular Italian charm link that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 2 is a top view of the transitional post charm link connected to a 9 mm charm link and 13 mm charm link in the expanded position;

FIG. 2A is a top view of the transitional post charm link connected to a 9 mm charm link and 13 mm charm link in the static position;

FIG. 3 is a top view of the transitional hook charm link connected to a 9 mm charm link and 13 mm charm link in the expanded position;

FIG. 3A is a top view of the transitional hook charm link connected to a 9 mm charm link and 13 mm charm link in the contracted position;

FIG. 4 is a top view of the transitional post and hook charm link connected to a two 9 mm charm links;

FIG. 4A is a top view of the transitional post and hook charm link connected to a two 9 mm charm links

DESCRIPTION OF THE REFERENCED NUMERALS

Figure 1:
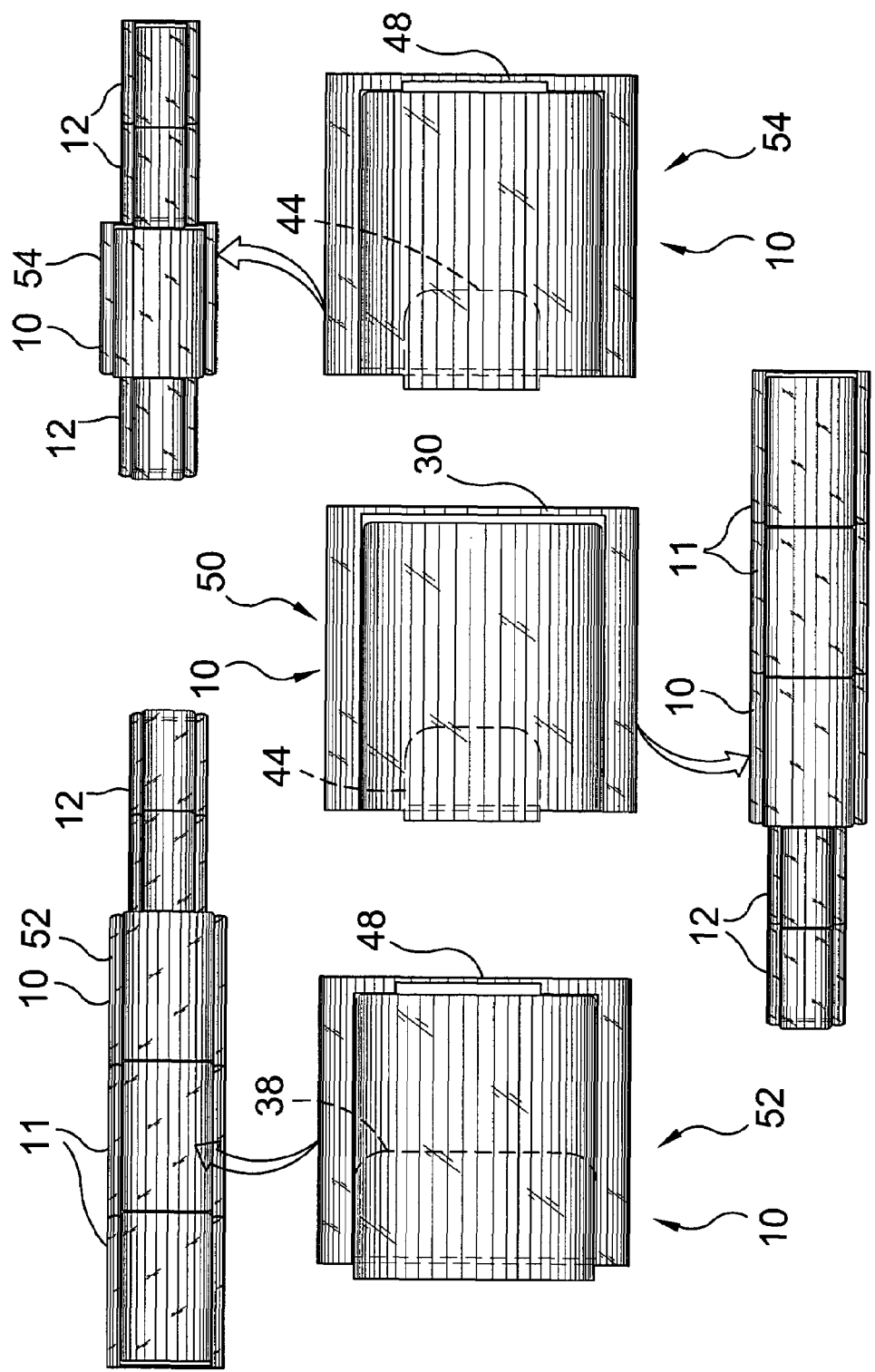
FIG. 1 is a top view of the three configurations of the present invention and their respective applications.

Turning now descriptively to the drawings, in which similar reference characters denote similar elements throughout the several views, the figures illustrate the Transitional Modular Italian Charm Link of the present invention. With regard to the reference numerals used, the following numbering is used throughout the various drawing figures.

10 Transitional Modular Italian Charm Link of the present invention
11 13 mm charm link
12 9 mm charm link
13 base member
14 charm face
16 bias means
18 linkage means
22 bottom plate of 13
24 sidewall of 13
26 retaining post of 13
28 locking recess of 13
30 13 mm linkage post
34 9 mm linkage post
36 9 mm linkage hook
38 13 mm linkage hook
40 retaining hook
42 tension spring
44 transitional linkage hook
46 transitional linkage recess
48 transitional linkage post
50 transitional hook charm link
52 transitional post charm link
54 transitional hook and post charm link

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a top view of the various configuration of the present invention 10. The present invention is a transitional modular Italian charm link 10 that can be fastened to various combinations of 13 mm charm links 11 and 9 mm charm links 12. One configuration provides a transitional post charm link 52 having a 9 mm transitional linkage post 48 for accepting the linkage hook of a 9 mm charm link 12 and a linkage hook 38 for connecting to a 13 mm charm link 11. Another configuration provides a transitional hook charm link 50 having a transitional linkage hook 44 that fastens to a 9 mm charm link 12 and a linkage post 30 for attaching to a 13 mm charm link 11. The third, and most versatile, configuration provides a transitional hook and post charm link 54 having a transitional linkage hook 44 and a transitional linkage post 48 for connecting 9 mm charm links 12. The transitional hook and post charm link 54 not only can accept a 9 mm charm link 12 on each side but also can also accept other 13 mm transitional hook and post charm links 54 on either side.

FIG. 2 is a top view of the present invention 10 attached to a 13 mm charm link 11 and a 9 mm charm link 12 in an expanded position. Shown is the linkage hook 39 of the transitional post charm link 52 secured to the linkage post 30 of a 13 mm charm link 11 and the transitional linkage post 48 of the transitional post charm link 52 retaining the linkage hook 36 of the 9 mm charm link 12.

FIG. 2A is a top view of the transitional post charm link 52 of the present invention 10 attached to a 13 mm charm link 11 and a 9 mm charm link 12 in a contracted position.

FIG. 3 is a top view of the present invention 10 attached to a 9 mm charm link 12 and another 9 mm charm link 12 in an expanded position. Shown is the transitional linkage hook 44 of the transitional post and link charm link 54 secured to the linkage post 34 of a 9 mm charm link 12 and the transitional linkage post 48 of the transitional post charm link 52 retaining the linkage hook 36 of the 9 mm charm link 12.

FIG. 3A is a top view of the present invention 10 attached to a 9 mm charm link 12 and another 9 mm charm link 12 in a contracted position.

FIG. 4 is a top view of the present invention 10 attached to a 13 mm charm link 11 and a 9 mm charm link 12 in an expanded position. Shown is the transitional linkage hook 44 of the transitional hook charm link 50 secured to the linkage post 34 of a 9 mm charm link 12 and the linkage post 30 of the transitional hook charm link 50 retaining the linkage hook 38 of the 13 mm charm link 11.

FIG. 4A is a top view of the present invention 10 attached to a 13 mm charm link 11 and a 9 mm charm link 12 in a contracted position.

Figure 5:
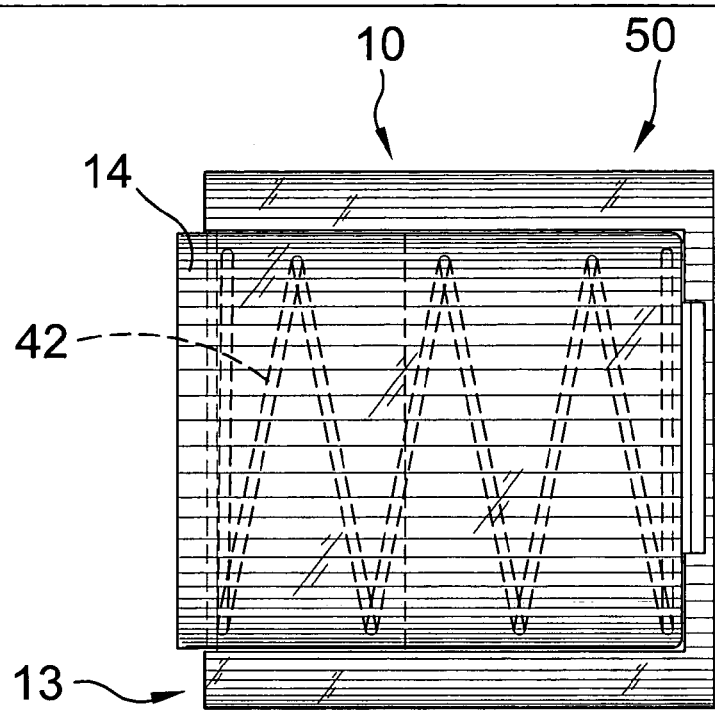
FIG. 5 is a top view of the present invention in the contracted position depicting the internal tension spring element.

FIG. 5 is a top view of a transitional post charm link 50 of the present invention 10 in the contracted position depicting the internal tension spring 42 element. A tension spring 42 maintains the charm face 14 in the closed position over the base 13 until a stronger opposing bias is placed thereagainst.

Figure 5A:
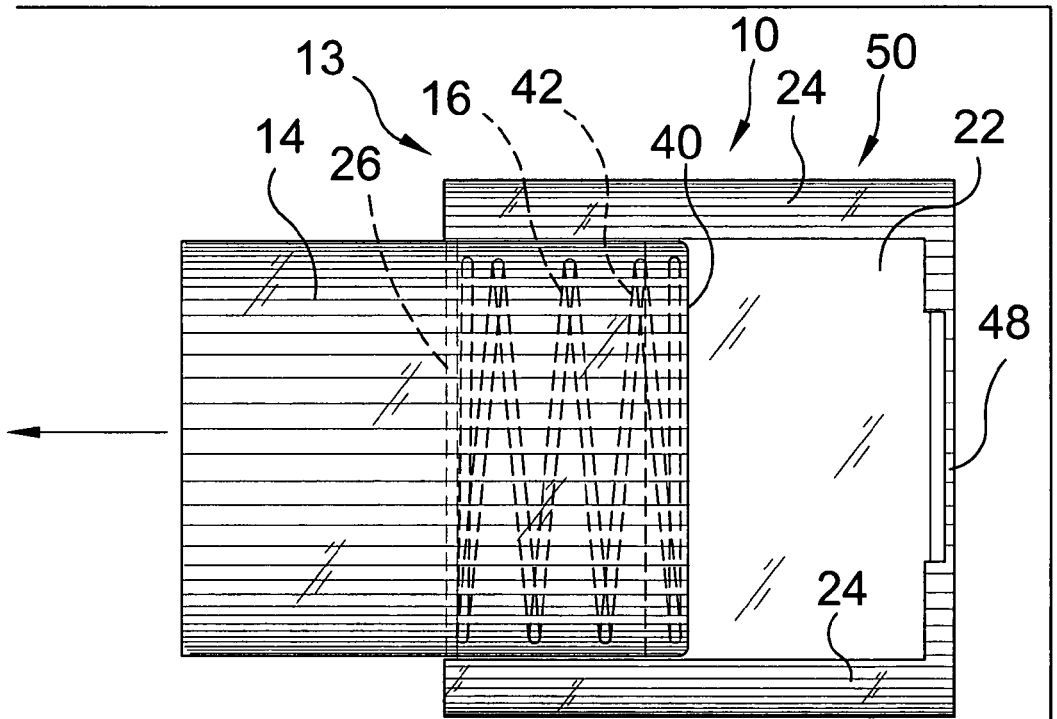
FIG. 5A is a top view of the present invention in the expanded position depicting the internal tension spring element.

FIG. 5A is a top view of a transitional post charm link 50 of the present invention 10 in an expanded position depicting the compression of the internal tension spring 42 element. The tension spring 42 is maintained between the charm face 14 and the retaining hook 40 residing along the bottom plate 22 of the 13 and provides a bias means 16 to urge the charm face 14 to remain in the closed position as it slides between the two sidewalls 24. The tension spring 42 places opposing forces against the retaining hook 40 of the charm face 14 and the retaining post 26 of the base member 13.

Figure 6:
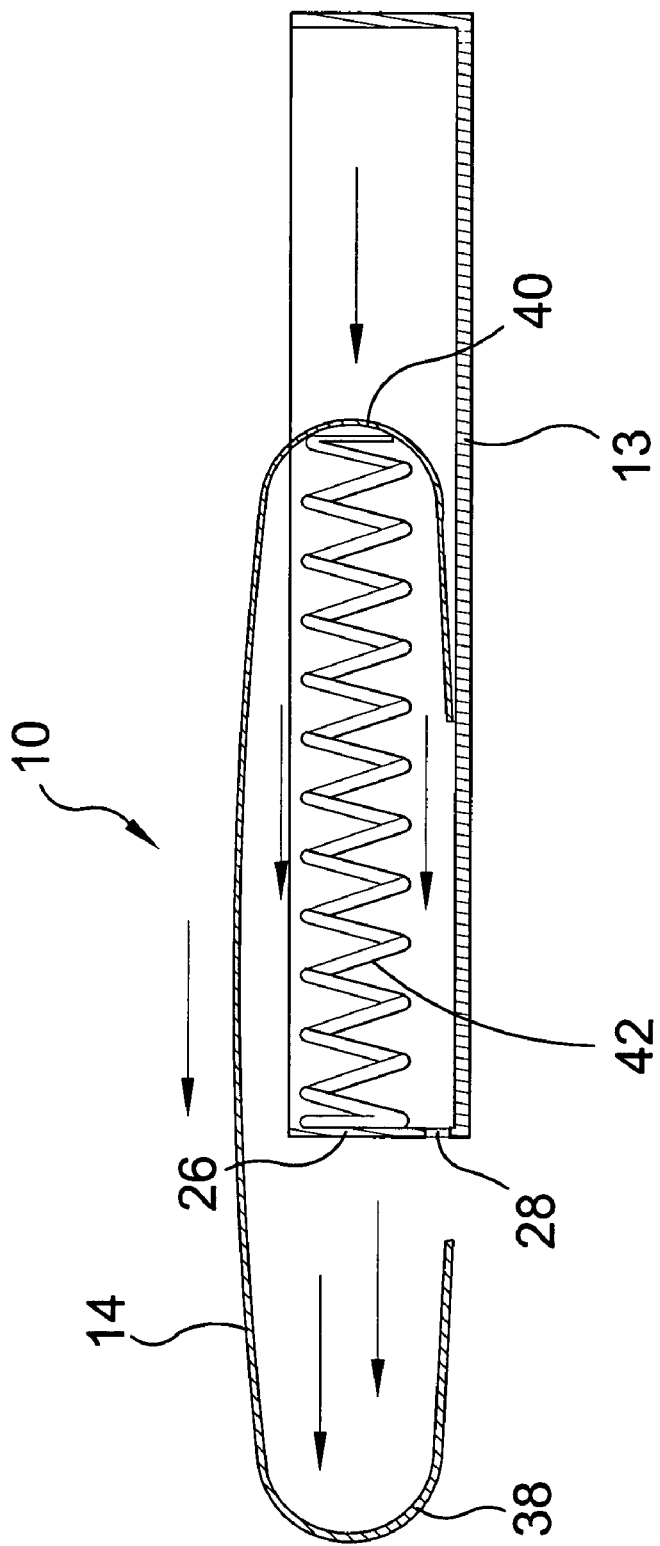
FIG. 6 is a cross sectional side view of the present invention.

FIG. 6 is a cross sectional side view of the present invention 10 depicting the tension spring 42 which places opposing forces against the retaining hook 40 of the charm face 14 and the retaining post 26 of the base member 13.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A transitional modular Italian charm link comprising:
   a) a base member;
   b) a slidable charm face removably attached to said base member;

c) means for applying a bias to said charm face to maintain it in a closed position substantially covering said base member;

d) a linkage means for pivotally securing said charm link to another charm link of an equal width; and e) a transitional linkage means for pivotally securing said charm link to another charm link of a lesser width.

2. A transitional modular Italian charm link as recited in claim 1, wherein said base member comprises:

a) a bottom plate;

b) two opposing sidewalls extending peripherally from edges of said bottom plate;

c) a rigid transverse post member forming a retaining post laterally communicating between a medial portion of an end of one of said two opposing sidewalls and a medial portion of an end of another of said two opposing sidewalls and disposed so as to define a locking recess between said post, said bottom plate and said sidewalls; and d) an opposing rigid transverse post member forming a linkage post laterally communicating between a medial portion of the end of said one of said two opposing sidewalls and a medial portion of the end of said another of said two opposing sidewalls and disposed so as to define a linkage recess between said post, said bottom plate and said sidewalls.

3. A transitional modular Italian charm link as recited in claim 2, wherein said slidable charm face comprises:

a) a slidable plate positioned between a top portion of said two opposing sidewalls on a plane substantially level therewith, said slidable plate having a first end and a second end;

b) an arcuate linkage hook extending from said first end of said slidable plate passing beyond and over a retaining post and curving downward and back towards a center of said slidable plate so as to pass through a locking recess back into said base member; and c) an arcuate retaining hook extending from said second end of said slidable plate and disposed between said two opposing sidewalls, said retaining post and said linkage post and curving downward and back towards the center of said slidable plate leaving a gap between an end of said linkage hook and an end thereof.

4. A transitional modular Italian charm link as recited in claim 3, wherein said bias means is a tension spring within said base member disposed between said slidable plate and a bottom portion of said retaining hook to provide a bias against said retaining post and said retaining hook to urge said retaining hook thereaway to maintain said charm face in a closed position substantially covering said base member until a greater counter-bias is applied thereto thus sliding said charm face off center and extending said linkage hook away from said base member.

5. A transitional modular Italian charm link as recited in claim 4, wherein said linkage means for pivotally securing said charm link to an adjacent charm link of an equal width is accomplished by offsetting said charm face to extend said linkage hook and exposing an end thereof and inserting it over the linkage post and through the linkage recess of the adjacent charm link and releasing the charm face thereby allowing said tension spring to retract it back into the closed position with the linkage hook subsequently returning through said locking recess.

6. A transitional modular Italian charm link as recited in claim 3, wherein said linkage hook is transitional and narrower in width relative than said charm face and at an appropriate width for insertion into the linkage recess of a smaller charm link to provide said linkage means for pivotally securing said charm link to an adjacent charm link of a lesser size.

7. A transitional modular Italian charm link as recited in claim 3, wherein said linkage recess and said linkage post are transitional and appropriately sized to receive the linkage hook of a smaller charm link while prohibiting linear movement thereof along said linkage post thereby providing said linkage means for pivotally securing said charm link to an adjacent charm link of a lesser sized.

8. A transitional modular Italian charm link as recited in claim 1, wherein said charm link further includes a transitional hook and a standard post.

9. A transitional modular Italian charm link as recited in claim 1, wherein said charm link further includes a transitional post and a standard hook.

10. A transitional modular Italian charm link as recited in claim 1, wherein said charm link further includes transitional post and a transitional hook.

* * * * *